No. 875,777.
PATENTED JAN. 7, 1908.
J. R. CALLAHAN.
FISH HOOK.
APPLICATION FILED APR. 27, 1907.
2 SHEETS—SHEET 1.
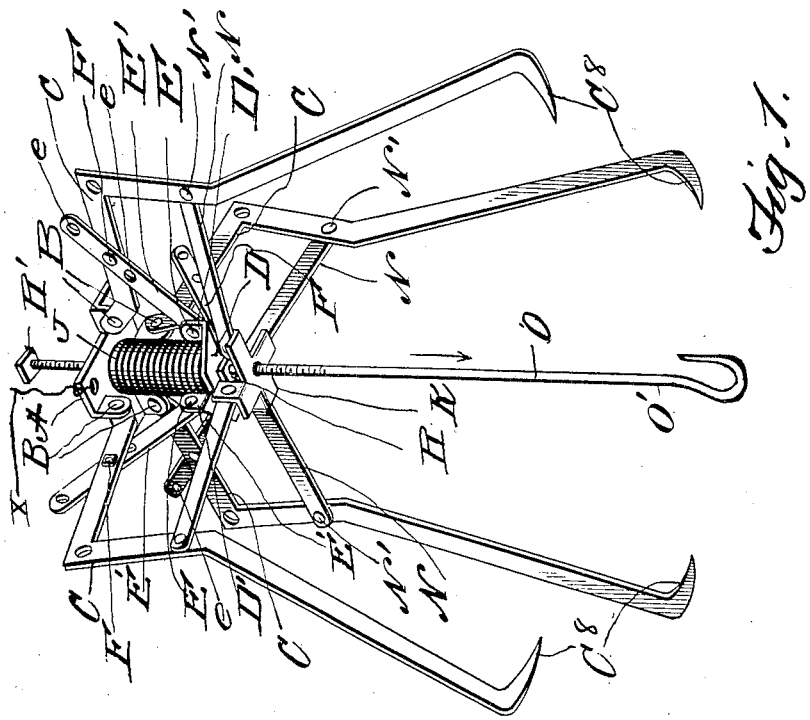
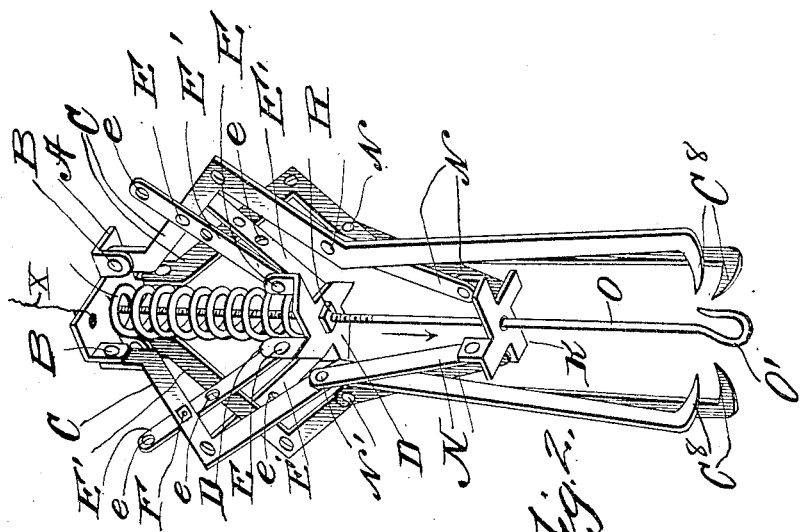
Witnesses
R. A. Powell.
A. C. Hough.
Inventor:
J. R. Callahan,
By Franklin H. Hough
Attorney No. 875,777.
PATENTED JAN. 7, 1908.
J. R. CALLAHAN.
FISH HOOK.
APPLICATION FILED APR. 27, 1907.
2 SHEETS—SHEET 2.
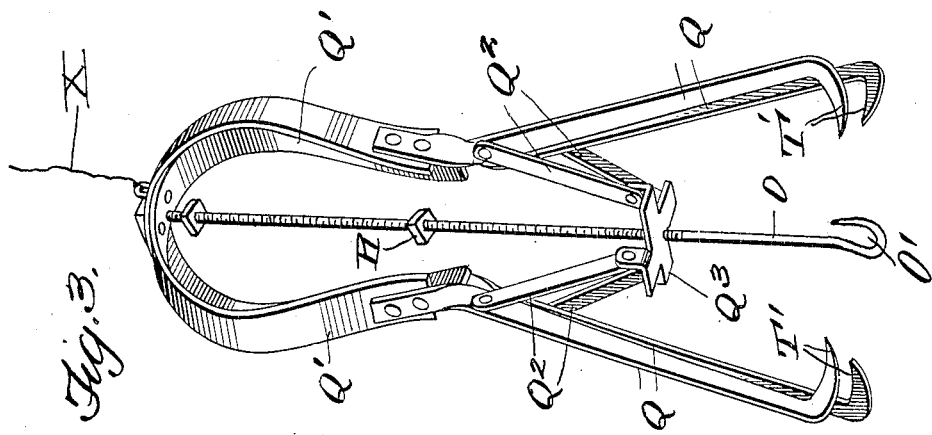
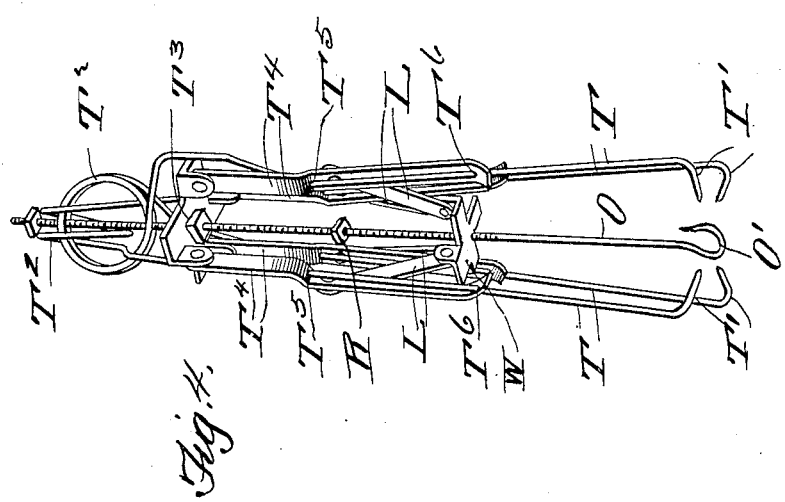
Witnesses
Inventor:
J. R. Callahan,
By Franklin H. Hough
his Attorney

UNITED STATES PATENT OFFICE.

JOHN R. CALLAHAN, OF MILLVILLE, NEW JERSEY.

FISH-HOOK.

No. 875,777. Specification of Letters Patent. Patented Jan. 7, 1908.

Application filed April 27, 1907. Serial No. 370,668.

*To all whom it may concern:*

Be it known that I, JOHN R. CALLAHAN, a citizen of the United States, residing at Millville, in the county of Cumberland and State of New Jersey, have invented certain new and useful Improvements in Fish-Hooks; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in spring-pressed fish hooks or traps, and comprises essentially a series of levers which are pivotally connected to a plate and having link connection with a trip plate through which a bait carrying rod is adapted to pass, said levers and plates being adapted to spring toward each other as the bait rod is moved longitudinally, thereby causing the various hooks at the ends of the levers to grasp and hold the fish attempting to take the bait.

My invention comprises various details of construction and combinations and arrangements of parts which will be hereinafter fully described and then specifically defined in the appended claims.

I illustrate my invention in the accompanying drawings, in which:—

Figure 1 is a perspective view of my improved spring-actuated fishing hook or trap set. Fig. 2 is a similar view showing the trap sprung, Fig. 3 is a detailed view of a modified form of my invention in which the shank portions of the arms are made resilient and provided with hooks at their ends and in which the coiled spring shown in Fig. 1 is dispensed with and Fig. 4 is a still different modification of my invention.

Reference now being had to the details of the drawings by letter, A designates a plate having a plurality of wings, each of which is bent at right angles to the face of the plate and carries a pivotal pin B.

C, C designates angle levers which are pivotally mounted upon said pins B and their free ends are formed into hooks C<sup>s</sup> adapted to coöperate with one another to grasp and hold a fish as the trap is sprung.

D designates a plate which is also pro-
vided with right angled wings D' carrying pivot pins E to which the links E' are pivotally connected. Said links E' are provided with a series of apertures $e$, whereby said links may be held in adjusted positions with relation to said levers to which they are pivotally connected by means of the pins F.

K designates a springing plate which is similar to the plates described and provided with wings bent at right angles to the face thereof, and N designates toggle links which are pivoted at their inner ends to the wings of said plate K, and their outer ends are pivotally connected at N' to said angle levers. Each of said plates is centrally apertured and is adapted to receive a bait rod O which is threaded a portion of its length and adapted to receive an adjusting nut R, which, when the bait rod is moved in the direction of the arrow in Fig. 1, will bear against the springing plate K and moving the latter, spring the trap. A second nut R' is mounted upon the threaded end of the rod and is adapted to contact with the plate A to limit the longitudinal movement of said rod in one direction. Said bait rod is preferably provided with a hook O', whereby bait may be securely held thereon.

Interposed between the plate A and the plate D about said bait rod is a coiled spring J, the office of which is to normally hold the hooked ends of said levers in the positions shown in Fig. 2 of the drawings, so as to engage and hold a fish caught thereby.

In Fig. 3 of the drawings, I have shown the arms Q having shank portions Q', which are made of a resilient metal and fastened together at their points of intersection, and provided with registering apertures to receive the usual bait rod. In said Fig. 3, the arms are shown as twisted at right angles to the resilient shank portion and have the toggle links Q² pivotally connected at their outer ends thereto and their inner ends pivotally connected to the wings of the plate Q³, which latter is apertured to receive the bait rod.

In Fig. 4 of the drawings, I have shown a still different modification of the spring-actuated means for throwing the hooks and, in said view, I make the arms T of resilient wire, the ends of which are bent to form hooks T' and each wire is bent to form a coil T², which coils are independent of each other, each passing through the other. In the modified form shown in Fig. 4 of the drawings, the usual apertured plate T³ is provided which is centrally apertured to receive a bait rod, and to each of the wings of the plate is pivotally connected a metallic strip T⁴ which is provided with two apertures designated respectively by letters T⁵ and T⁶, said strips being bent as shown in order that the resilient wire arms may be passed through said apertures in the manner illustrated. The usual toggle links L are provided which connect the various strips with the plate W, which is centrally apertured to receive the bait rod.

While I have shown and described the various plates to which the spring arms or the spring-actuated arms are pivotally connected as being provided with angled wings, it will be understood that said plates may be square in outline or of any other shape and arms hinged thereto in any suitable manner.

In operation, the trap which is suspended from a line X fixed to the plate A is set by drawing the plate K toward the plate D and in so doing, the toggle links connecting the plate K with said levers will cause the latter to be thrown outward, and as the levers are swung outward, the links E' which connect the plate D with said lever will cause said plate D to be drawn up against the tension of said spring. When the plate K is drawn up sufficiently, the links N connected therewith will buckle, coming in contact with the under face of the plate D, and hold the trap set. The nut R upon the bait rod may be adjustably held in different positions upon the rod, and is adapted as the rod is pulled upon longitudinally, in the direction of the arrow (Fig. 1) to bear against the upper surface of the plate K and cause the links N to lower and when they have passed a horizontal position, the spring will act upon the plate D, causing the same to be thrown back to its normal position, and through its connection with the levers, the latter will be drawn toward each other under the force of the spring and will grip the fish or other object against which the points of the levers come in contact.

It will thus be noted that by the provision of a spring-pressed fish hook or trap as shown and described, an efficient apparatus is afforded whereby the levers may be set and quickly brought together under the action of the spring as the bait rod with its adjusting nut thereon is moved longitudinally in one direction, thereby causing a fish or other object, which comes within the path of the hooks, to be impaled and securely held.

While I have shown a particular form of spring-actuated levers, it will be understood that these details may vary and, if desired, two or more hooks may be employed and either made of spring material or actuated by a spring, whereby the hooks may be forcibly thrown toward each other when the trap is sprung.

What I claim is:—

1. A spring-pressed fish trap, comprising an apertured plate, a series of spring-actuated levers pivotally connected thereto, the ends of said levers being formed into hooks, an apertured springing plate, toggle link connections between the same and said levers, a bait rod passing through apertures in said plates, and having a movement independent thereof, and means carried by said rod for moving said springing plate, as set forth.

2. A spring-pressed fish trap, comprising an apertured plate, a series of spring-actuated levers pivotally connected thereto, the ends of said levers being formed into hooks, an apertured springing plate, toggle link connections between the same and said levers, a bait rod passing through apertures in said plates, and an adjusting nut mounted upon the bait rod and adapted to bear against said springing plate as the rod is moved longitudinally, as set forth.

3. A spring-pressed fish trap, comprising a plate, a series of levers pivotally connected thereto, the ends of said levers being formed into hooks, an apertured springing plate, toggle link connections between the same and said levers, a third and intermediate plate, a spring interposed between the latter and the plate to which said levers are pivotally connected, and means for springing the trap, as set forth.

4. A spring-pressed fish trap, comprising an apertured plate, a series of levers pivotally connected thereto, the ends of said levers being formed into hooks, an apertured springing plate, toggle link connections between the same and said levers, a third and intermediate plate, a spring interposed between the latter and the apertured plate to which said levers are pivotally connected, a threaded bait rod passing through registering apertures in said plates, and an adjusting nut mounted upon the threaded portion of said rod and adapted to bear against the springing plate as the rod is moved longitudinally, as set forth.

5. A fish trap, comprising an apertured plate having wings projecting therefrom at angles to the face of the plate, levers pivotally connected to said wings and having hooked ends, an apertured springing plate having wings at angles thereto, toggle links pivotally connecting the levers to the wings of said springing plate, an apertured plate intermediate the springing plate and the plate to which said levers are pivotally connected and provided with wings, adjustable links pivotally connecting the latter to said levers, a threaded bait rod passing through registering apertures in said plates a spring mounted upon said rod and bearing between two of said plates and adapted to normally hold the hooks at their farthest inner throw, an adjusting nut mounted upon the threaded portion of said rod and adapted to bear against the springing plate as the rod is moved longitudinally, as set forth.

In testimony whereof I hereunto affix my signature in the presence of two witnesses.

JOHN R. CALLAHAN.

Witnesses:
SHEPPARD S. McALLISTER,
THOMAS WHITAKER.